United States Patent [19]

Itoh et al.

[11] Patent Number: 5,787,224
[45] Date of Patent: Jul. 28, 1998

[54] DEVICE FOR AND METHOD OF EDITING INFORMATION

[75] Inventors: Naoto Itoh; Minemasa Ohta, both of Yamanashi-ken, Japan

[73] Assignees: Pioneer Electronic Corporation, Tokyo-to; Pioneer Video Corporation, Yamanashi-ken, both of Japan

[21] Appl. No.: 613,033

[22] Filed: Mar. 8, 1996

[30] Foreign Application Priority Data

Mar. 13, 1995 [JP] Japan ................. 7-052975

[51] Int. Cl.$^6$ ................. H04N 5/93; G11B 27/00
[52] U.S. Cl. ................. 386/52; 386/112; 386/126; 360/13; 369/83; 369/84
[58] Field of Search ................. 358/335, 311, 358/342; 360/13, 14.1, 14.2, 14.3; 348/705; 386/52, 55, 46, 111, 124, 112, 126; 395/200.03, 800; 369/124, 83–84; H04N 5/93

[56] References Cited

U.S. PATENT DOCUMENTS

| | | | |
|---|---|---|---|
| 5,130,797 | 7/1992 | Murakami et al. | 358/133 |
| 5,170,259 | 12/1992 | Niihara | 358/133 |
| 5,185,861 | 2/1993 | Valencia | 395/200 |
| 5,357,632 | 10/1994 | Pian et al. | 395/650 |
| 5,379,070 | 1/1995 | Retter et al. | 348/403 |
| 5,510,842 | 4/1996 | Phillips et al. | 348/426 |
| 5,532,744 | 7/1996 | Akiwumi-Assani et al. | 348/390 |
| 5,619,647 | 4/1997 | Jardine | 395/200.01 |
| 5,625,832 | 4/1997 | Ohasawa et al. | 395/800 |

*Primary Examiner*—Andrew I. Faile
*Assistant Examiner*—Vincent F. Boccio
*Attorney, Agent, or Firm*—Kane, Dalsimer, Sullivan, Kurucz, Levy, Eisele and Richard, LLP

[57] ABSTRACT

A device for editing information includes: a device for encoding a plurality of unit information each having a predetermined length and outputting the coded unit information consecutively at a first rate; a device for generating additional information to be added to the unit information; a plurality of editing devices for storing the unit information encoded by the encoding device and processing the unit information stored and the additional information in a parallel manner with each other at a second rate different from the first rate, respectively; a device for selectively supplying the unit information outputted by said outputting device to one of the editing device; and a device for detecting the editing unit which is not performing the processing and permitting the supplying device to supply a new unit information to the editing unit thus detected when said outputting device outputs the new unit information.

7 Claims, 2 Drawing Sheets

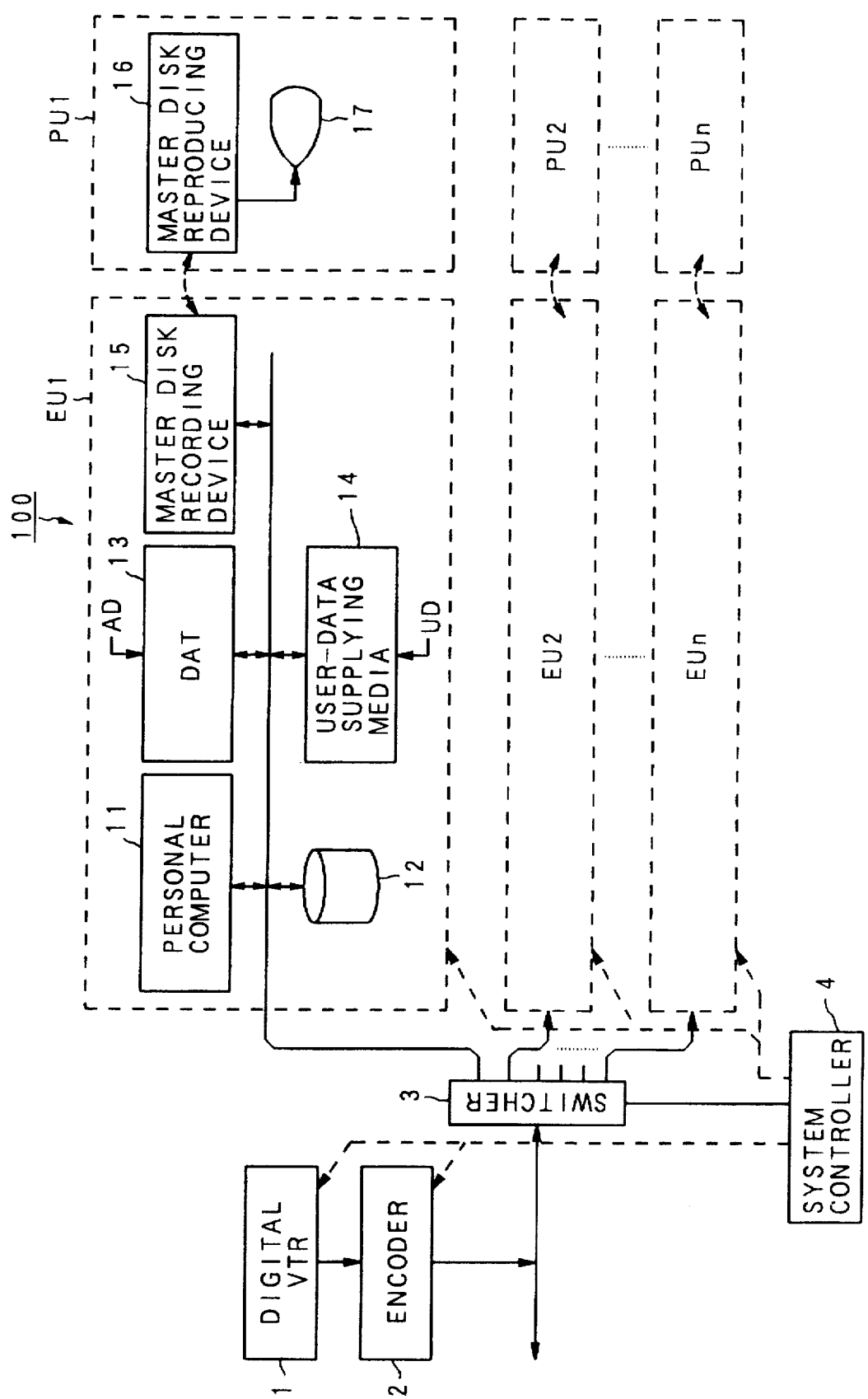

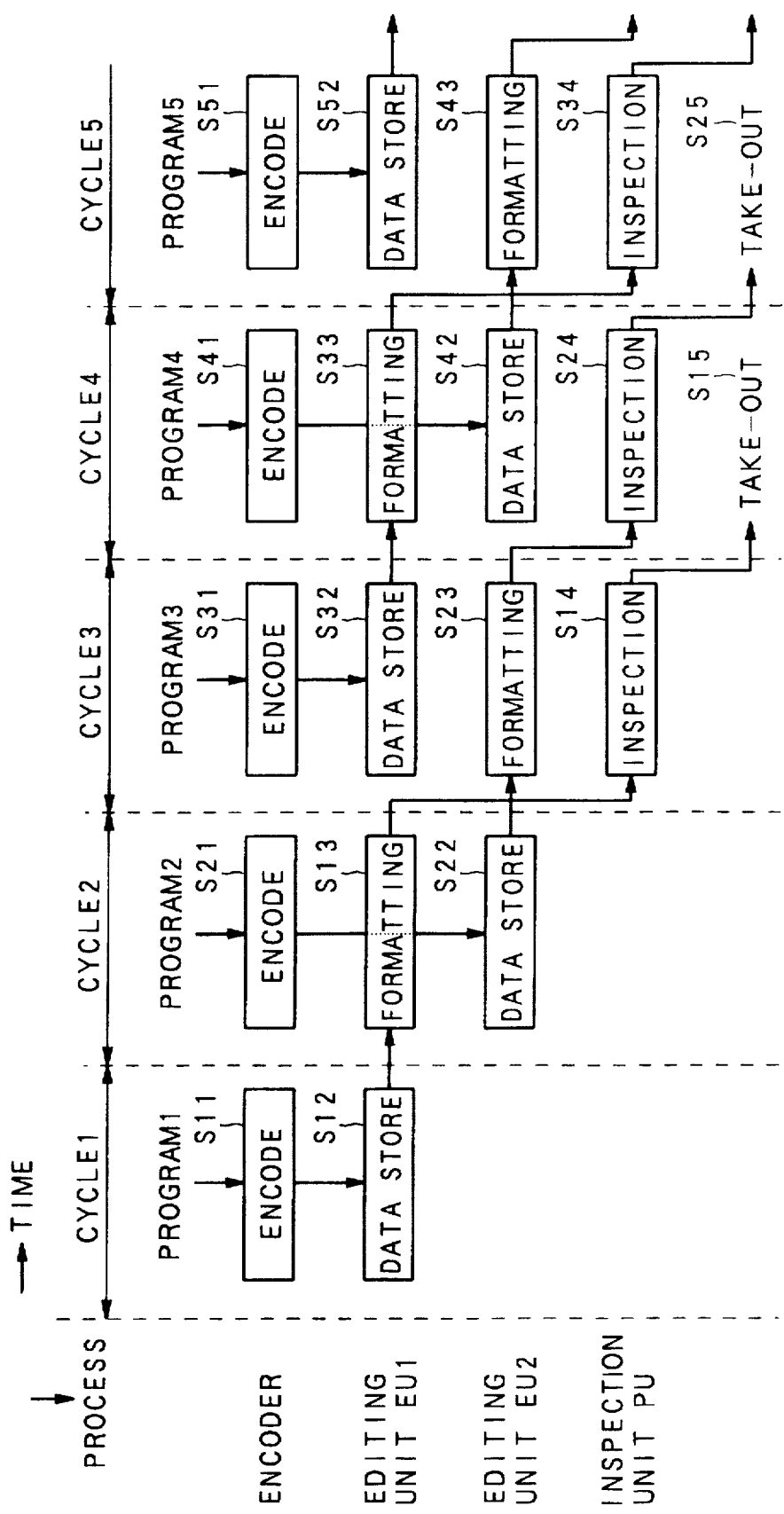

DEVICE FOR AND METHOD OF EDITING INFORMATION

BACKGROUND OF THE INVENTION

1. Field of the Invention

The present invention relates to a device for and a method of editing information in a so-called post production, and more particularly to an information editing technique for recording picture information on a recording medium with necessary additional information.

2. Description of the Prior Art

Recently, with the aid of the improved compressive coding technique, picture information such as a movie is compressed and recorded on a high density optical disk with necessary additional information. Generally, picture information is coded and recorded on a recording medium in the following manner. First, picture information of a movie or the like is coded by an encoder which compresses and encodes picture information to produce a coded picture signal. Specifically, the encoder detects motion component of the original pictures, eliminates unnecessary components, and encodes the original pictures so that the coded picture signal has sufficiently less information quantity than that of the original pictures. Then, the coded signal is formatted according to a predetermined format, and then additional information is added to the formatted signal. Thereafter, the picture signal thus obtained is recorded on a master disk.

Picture information is normally encoded and then recorded as a plurality of programs, which are picture information having a predetermined length. Namely, a plurality of programs are successively subjected to the high efficiency coding, and coded picture signals are obtained. Then, the coded signals corresponding to the programs are recorded. The time required for the high efficiency coding largely varies between different programs because the quantity of the moving component and/or edge component included in each programs differs from each other. On the other hand, the time required for recording the coded picture signal on the master disk does not vary so largely between different programs. This disables a smooth serial processing of coding and recording picture information on a recording medium.

In this view, there may be proposed a technique to add pseudo information to picture information to be recorded so that the coding rate becomes constant irrespective of the contents of picture information. However, this technique results in the deterioration of recording efficiency of the recording medium. Namely, if pseudo information is added to true picture information and then recorded, the usage of the recording medium is inefficient. This goes counter to the trend of improving recording density of recording medium, and therefore it is not acceptable.

On the other hand, there may be proposed another technique in which coded picture information is temporarily stored in a storage unit so as to absorb the variation of the required coding time. However, according to this technique, the high efficiency coding of the picture information and recording the coded signal on the master disk are not performed in parallel. Therefore, either one of the encoder and the master disk recording device should wait for the finish of the other processing, thereby resulting in the inefficient usage of the editing device.

SUMMARY OF THE INVENTION

It is an object of the present invention to provide a device for and a method of editing information with improved using efficiencies of the editing device and the recording medium.

According to one aspect of the present invention, there is provided a method of editing information including the steps of: preparing a plurality of unit information each having a predetermined length and outputting the unit information consecutively at a first rate; processing the unit information thus outputted in a parallel manner by a plurality of processing devices at a second rate different from the first rate, respectively; and detecting the processing device which is not performing the processing and permitting the processing device thus detected to perform the processing of a new unit information when the new unit information is outputted by the outputting step.

In accordance with the method, the unit information is outputted at the first rate, and then processed at the second rate by one of the plurality of processing device. When a new unit information is outputted, the processing device being not in processing is detected and the detected processing device processes the new unit information. Therefore, even if the first rate is different from the second rate, the editing operation can be continued without terminating the consecutive output of the unit information.

According to another aspect of the present invention, there is provided a device for editing information including: a device for preparing a plurality of unit information each having a predetermined length and outputting the unit information consecutively at a first rate; a plurality of devices for processing the unit information thus outputted in a parallel manner with each other at a second rate different from the first rate, respectively; a device for selectively supplying the unit information outputted by said outputting device to one of the processing device; and a device for detecting the processing device which is not performing the processing and permitting the supplying device to supply a new unit information to the processing device thus detected when said outputting device outputs the new unit information.

In accordance with the device thus configured, the outputting device outputs the unit information at the first rate, and the processing device processes the unit information at the second rate. The detecting device detects the processing device not in processing and permits the detected processing device to process the new unit information. Namely, the detecting device usually monitors the operation of the processing devices and controls the parallel operation of them so that the new unit information is processed by the processing unit not being in operation. Therefore, even if the first rate is different from the second rate, the processing of the unit information can be continued without terminating the consecutive output of the unit information.

According to still another aspect of the present invention, there is provided a device for editing information including: a device for encoding a plurality of unit information each having a predetermined length and outputting the coded unit information consecutively at a first rate; a device for generating additional information to be added to the unit information; a plurality of editing devices for storing the unit information encoded by the encoding device and processing the unit information stored and the additional information in a parallel manner with each other at a second rate different from the first rate, respectively; a device for selectively supplying the unit information outputted by said outputting device to one of the editing device; and a device for detecting the editing device which is not performing the processing and permitting the supplying device to supply a new unit information to the editing device thus detected when said outputting device outputs the new unit information.

In accordance with the device thus configured, the outputting device outputs the coded unit information at the first rate, and the editing device processes the unit information at the second rate. The detecting device detects the processing device not in processing and permits the detected processing device to process the new unit information. Namely, the detecting device usually monitors the operation of the processing devices and controls the parallel operation of them so that the new unit information is processed by the processing unit not being in operation. Therefore, even if the first rate is different from the second rate, the processing of the unit information can be continued without terminating the consecutive output of the unit information.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 1 is a block diagram illustrating a configuration of a video editing device according to an embodiment of the invention; and FIG. 2 is a chart illustrating a process of editing picture information by the video editing device of this invention.

DETAILED DESCRIPTION OF THE PREFERRED EMBODIMENTS

A preferred embodiment of the present invention will now be described with reference to the accompanying drawings. FIG. 1 illustrates a configuration of a video editing device according to an embodiment of the present invention. As shown in FIG. 1, the video editing device 100 is provided with a digital VTR 1, an encoder 2, a switcher 3 and a system controller 4. The video editing device 100 further includes a plurality of (n in this case) editing units EU1 to EUn connected to the switcher 3 and a plurality of inspecting units PU1 to PUn, each corresponding to the editing units EU1 to EUn. The digital VTR 1 reproduces and outputs a digital video signal, such as a video signal of movie which is obtained from a source picture of movie and is converted into the video signal. The encoder 2 encodes the picture signal supplied from the digital VTR 1 by means of a high efficiency encoding technique which performs motion compensation of original pictures. For instance, the encoder 2 compresses the picture signal according to MPEG (Moving Picture Experts Group), the standard of the high efficiency encoding of moving pictures. The switcher 3 receives the encoded picture signal outputted by the encoder 2, and selectively supplies it to one of the editing units EU1 to EUn. The system controller 4 is mainly constituted by a personal computer or the like, and instructs the digital VTR 1 and the encoder 2 to start the operation. In addition, the system controller 4 monitors the performances of the equipments in the editing units and gives switching instructions to the switcher 3 according to the performances of the respective editing units.

Each of the editing units EU1 to EUn includes a personal computer 11, a harddisk 12, a digital audio tape recorder (DAT) 13, a user-data supplying media 14 and a master disk recording device 15. The personal computer 11 carries out formatting of the coded picture signal, supplied from the switcher 3 to the hard disk 12, so as to adapt the coded picture signal to a predetermined format. Preferably, the coded picture signal is formatted to be in conformity with the format of the commercial optical disk replicated by the following mastering process, because the inspection unit can check the quality of formatting. The DAT 13 reproduces a digital audio data. The user-data supplying media 14 supplies the user-data including the title and the dialogue superimposed on the movie from an information recording medium such as a magnetooptical disk. The master disk recording device 15 records the coded picture signal on an optical recording medium with the digital audio data and the user-data. A high density WORM (Write Once Read Many) type disk may be used as the optical recording medium. The inspection unit is needed to inspect the quality of the master disk produced by the editing unit, although it does not contribute to the production of the master disk directly. Specifically, the master disk reproduction device 16 reproduces the master disk to check the decoded signal and physical format information and displays them on the monitor 17.

In case of recording a source picture of the theater movie on a video disk in a form of video signal, the video signal and the audio signal are separated from each other because the recording format thereof differs from each other. The picture of the movie source is converted into the video signal with the help of a telecine camera or the like. In this embodiment, the picture signal in the form of the video signal is reproduced by the digital VTR 1. With respect to the audio signal, multi channel audio of the soundtrack (e.g., 6 tracks) is digitized, and the multi channel digital audio data thus obtained is reproduced by the DAT 13. Additionally, the picture information such as the title and/or the dialogue is supplied by the user-data supplying media 14.

Next, the operation of the picture editing device 100 will be described with reference to FIG. 2. The following description is directed to a case where only two editing units EU1 and EU2 are used in parallel, for the sake of simplicity. Of course, the concept of the present invention is applicable to the case where more editing units are operated simultaneously.

The digital VTR 1 reproduces a plurality of programs consecutively from the program P1. Firstly, the first program P1 is reproduced by the digital VTR 1, and is coded by the encoder 2 according to the high efficiency coding technique (step S11). During this operation, the system controller 4 permits the switcher 3 to select the editing unit EU1. Then, the personal computer 11 in the editing unit EU1 stores the coded picture signal transferred from the encoder 2 in the harddisk 12 (step S12). When the reproduction of the program P1 is finished, the system controller 4 instructs to the personal computer 11 in the editing unit EU1 to perform the formatting (step S13). The personal computer 11 in the editing unit EU1 reads out the coded picture signal of the program P1 from the harddisk 12, and converts the format thereof to be adapted to the predetermined format so that the signal thus formatted can be recorded in the master disk. Then, the personal computer 11 supplies the formatted signal to the master disk recording device 15. Simultaneously, the DAT 13 reproduces the digital audio data corresponding to the program P1 and supplies it to the master disk recording device 15, and the user-data supplying unit 14 supplies the character data corresponding to the program P1 to the master disk recording device 15. The personal computer 11, the DAT 13 and the user-data supplying unit 14 are controlled based on the time code generated by the system controller 4. Therefore, the coded picture signal, the digital audio signal and the character signal are supplied to the master disk recording device 15 synchronously with each other, and recorded on the WORM disk.

When the master disk recording device 15 in the editing unit EU1 finishes the production of the master disk in step S13, the master disk on which the program P1 is recorded is taken out of the master disk recording device 15 and is inspected by the inspection unit PU1 (step S14). If the master disk passes the inspection, it is taken out as a finished product and used in the mastering process replicating optical disks for sale on a market (step S15). In the mastering process, error correction codes are added to the recorded signal obtained by the demodulation of the master disk, and the added signal is supplied to an original disk exposure device. The original disk exposure device exposes the original optical disk coated with the photo resist by using the laser light modulated according to the recording signal thus modulated. Then, the original disk enters the electroforming process by which a stamper having pit formations reverse to those of the original disk is produced. In the replication process, the stamper is coated with resin and optical disks to be put on the market are produced.

When the coding of the program P1 is finished, the digital VTR 1 begins the reproduction of the next program P2. Namely, the coding of the second program P2 is performed in parallel with (simultaneously with) the formatting for the program P1 by the editing unit EU1 in step S12. The encoder 2 performs the high efficiency coding without delay (step S21). The system controller 4 permits the switcher 3 to select the editing unit EU2 when it detects that transferring the program P1 to the editing unit EU1 is finished. The coded picture signal of the program P2 supplied from the encoder 2 is transferred to the harddisk 12 in the editing unit EU2 this time (step S22). When transferring the coded picture signal of the program P2 is finished, the personal computer 11 in the editing unit EU2 starts formatting the coded picture signal of the program P2, the digital audio data and the user-data, in the similar manner as the step S13. The master disk recording device 15 in the editing unit EU2 records the program P2 on the WORM disk (step S23). When the master disk is produced, it is inspected by the inspection unit PU2. After the inspection, the master disk carrying the program P2 is supplied to the mastering process.

When transferring the coded picture signal to the editing unit EU2 is finished in step S22, the system controller 4 again permits the switcher 3 to select the editing unit EU1. Simultaneously, the digital VTR 1 begins a reproduction of the program P3, and the encoder 2 carries out the high efficiency coding (step S31). The editing unit EU1 then performs transferring the program P3, formatting, producing the master disk, inspection and shipping in the same manner as steps S12 to S15. Subsequently, the system controller 4 alternatively changes the selection of the editing units EU1 and EU2, and repeats the same operations (from step S41, S51, . . . ).

Normally, the high efficiency coding of the original picture signal performed by the encoder takes longer time than the formatting and recording operation performed in the editing unit. In this view, if the time periods required for the coding are not so different between the different programs, editing operation can be carried out, without terminating the coding operation by the encoder, by using two editing units in parallel. However, if the coding time periods are largely different between the programs, it is likely that the transfer of the coded signal to one editing unit is finished before the formatting and recording operation end in the other editing unit. Namely, if only two editing units are employed, the operation of the digital VTR 1 and the encoder 2 in one editing unit should be terminated until the other editing unit finishes the formatting and recording operation. In this view, preferably more than three editing units are prepared in this invention, as shown in FIG. 1, and the next program is transferred to the editing unit other than the first and second editing units. By doing so, the editing operation can be continued without termination even if the required coding times of the programs are different from each other relatively largely.

The application of the present invention is not limited to the high efficiency coding of picture information described above. Namely, the present invention is applicable to any kind of systems which improve total editing efficiency by appropriately changing the data processing stream, even when the data transfer from a reproduction device to a recording device cannot be performed on real time basis. In the above embodiment, the digital audio signal and user-data to be added to the coded picture signal are supplied by the digital audio tape and the magnetooptical disk, respectively. As a modification, a digital audio tape and a magnetooptical disk are prepared for each of the programs separately, and an automatic changer for automatically supplying these media to the editing unit is also employed. Thus, the system controller 4 controls the automatic changer to supply the necessary media to the editing unit. Alternatively, an exclusive device for the reproduction of the digital audio signal and the user-data may be employed and controlled by the system controller 4.

As described above, according to the embodiment, the system controller 4 monitors the processing of the programs by the digital VTR and the encoder, and switches the editing units appropriately. Therefore, plural programs can be edited in a short time with the best use of the digital VTR and the encoder. Namely, the efficiency of using the equipments may be improved. In addition, since the inspection of the master disk can be executed in a serial manner, the system can be controlled only by a single person.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A device for editing information for use in a premastering of an optical disc, said device comprising:

a singular means for encoding and compressing a plurality of unit information each having a predetermined length and outputting the unit information at a first rate;

a plurality of means for processing the unit information thus outputted in a parallel manner with each other at a second rate different from the first rate, respectively and further comprising a plurality of means to perform a process of mastering the optical disc;

means for selectively supplying the unit information outputted by said outputting means to one of the processing means; and means for detecting the processing means which is not performing the processing and permitting the supplying means to supply a new unit information to the processing means thus detected when said outputting means outputs the new unit information.

2. A device for editing information for use in a premastering of an optical disc, said device comprising:

a singular means for encoding and compressing a plurality of unit information each having a predetermined length and outputting the coded unit information consecutively at a first rate;

means for generating additional information to be added to the unit information;

a plurality of editing means for storing the unit information encoded by the encoding means and processing the unit information stored and the additional information in a parallel manner with each other at a second rate different from the first rate, respectively and further comprising a plurality of means to perform a process of mastering the optical disc;

means for selectively supplying the unit information outputted by said outputting means to one of the editing means; and means for detecting the editing means which is not performing the processing and permitting the supplying means to supply a new unit information to the editing means thus detected when said outputting means outputs the new unit information.

3. A device according to claim 2, further comprising means for supplying the additional information generated to the editing means detected by the detecting means.

4. A device according to claim 2, wherein each of said editing means comprises a storage means, a formatting means and a recording means, and while one of said editing means is receiving the unit information from said supplying means and storing the received unit information into said storage means, another editing means permits its formatting means to format the unit information stored in its storage means and permits its recording means to record the formatted unit information on a recording medium.

5. A device according to claim 4, wherein said formatting means formats the unit information by a format which is identical to a format of a commercial optical disc replicated in the mastering process of the optical disc.

6. A device for editing information for use in a pre-mastering of an optical disc, said device comprising:

a singular means for encoding and compressing a plurality of unit information each having a predetermined length and outputting the coded unit information consecutively at a first rate;

a plurality of editing means for storing the unit information encoded by the encoding means and processing the unit information stored in a parallel manner with each other at a second rate different from the first rate, respectively and further comprising a plurality of means to perform a process of mastering the optical disc;

means for selectively supplying the unit information outputted by said outputting means to one of the editing means; and means for detecting the editing unit which is not performing the processing and permitting the supplying means to supply a new unit information to the editing unit thus detected when said outputting means outputs the new unit information;

wherein each of said editing means comprises a storage means, a formatting means and a recording means, and while one of said editing means is receiving the unit information from said supplying means and storing the received unit information into said storage means, another editing means permits its formatting means to format the unit information stored in its storage means and permits its recording means to record the formatted unit information on a recording medium.

7. A device according to claim 6, wherein said formatting means formats the unit information by a format which is identical to a format of a commercial optical disc replicated in the mastering process of the optical disc.

* * * * *